United States Patent [19]

Schossow

[11] 4,155,001
[45] May 15, 1979

[54] ELECTRODE-TYPE VAPORIZER

[76] Inventor: George W. Schossow, 2316 Lilac La., White Bear Lake, Minn. 55110

[21] Appl. No.: 780,663

[22] Filed: Mar. 23, 1977

Related U.S. Application Data

[63] Continuation-in-part of Ser. No. 444,337, Feb. 21, 1974, Pat. No. 4,028,526, which is a continuation-in-part of Ser. No. 832,279, Jun. 11, 1969, Pat. No. 3,809,374.

[51] Int. Cl.² .......................... H05B 3/60; F22B 1/30
[52] U.S. Cl. ..................................... 219/287; 128/192;
219/275; 219/289; 219/292; 219/362; 422/298
[58] Field of Search .............................. 219/271–276,
219/284–295, 362; 128/186, 192; 21/117–119;
261/141, 142

[56] References Cited

U.S. PATENT DOCUMENTS

| 1,483,280 | 2/1924 | Cherry | 219/287 |
|---|---|---|---|
| 1,806,729 | 5/1931 | Aitken | 219/288 X |
| 1,987,381 | 1/1935 | Twombly | 219/288 |
| 1,990,790 | 2/1935 | Lenz | 219/284 |
| 1,994,331 | 3/1935 | Ziskin et al. | 219/292 |
| 2,140,516 | 12/1938 | Cowan | 219/289 X |
| 2,533,794 | 12/1950 | Hanks et al. | 219/290 X |
| 2,885,527 | 5/1959 | Tone et al. | 219/289 X |
| 3,809,374 | 5/1974 | Schossow | 219/273 X |
| 4,028,526 | 6/1977 | Schossow | 219/292 X |

FOREIGN PATENT DOCUMENTS

| 324740 | 9/1920 | Fed. Rep. of Germany | 219/288 |
|---|---|---|---|
| 512510 | 10/1920 | France | 219/292 |
| 617518 | 11/1926 | France | 219/292 |
| 1058160 | 11/1953 | France | 219/284 |
| 1088809 | 9/1954 | France | 219/284 |
| 412151 | 5/1968 | Switzerland | 219/285 |

*Primary Examiner*—A Bartis
*Attorney, Agent, or Firm*—John C. Barnes

[57] ABSTRACT

A vaporizer having an improved electrode-type steam generator structure. The generator comprises a tubular member defining a boiling chamber and a pair of concentric electrodes disposed in the bottom of the boiling chamber. The surface areas of the electrodes are in spaced relationship and the outer electrode encloses the inner electrode and is provided with means to control the rate and the escape of steam from the electrodes. This is done by providing the outer electrode with a tubular member extending above the water level in the boiling chamber for trapping steam generated by the electrodes and providing an adjustable valve in the form of a disk adjustable toward and away from an opening in the top of the tubular member for restricting the escape of the generated steam. The bottom surface of the disk is shaped to direct steam and water droplets back toward the water in the boiling chamber. The electrodes can be spaced a greater distance at the lower edge to maintain the resistivity therebetween generally constant.

6 Claims, 8 Drawing Figures

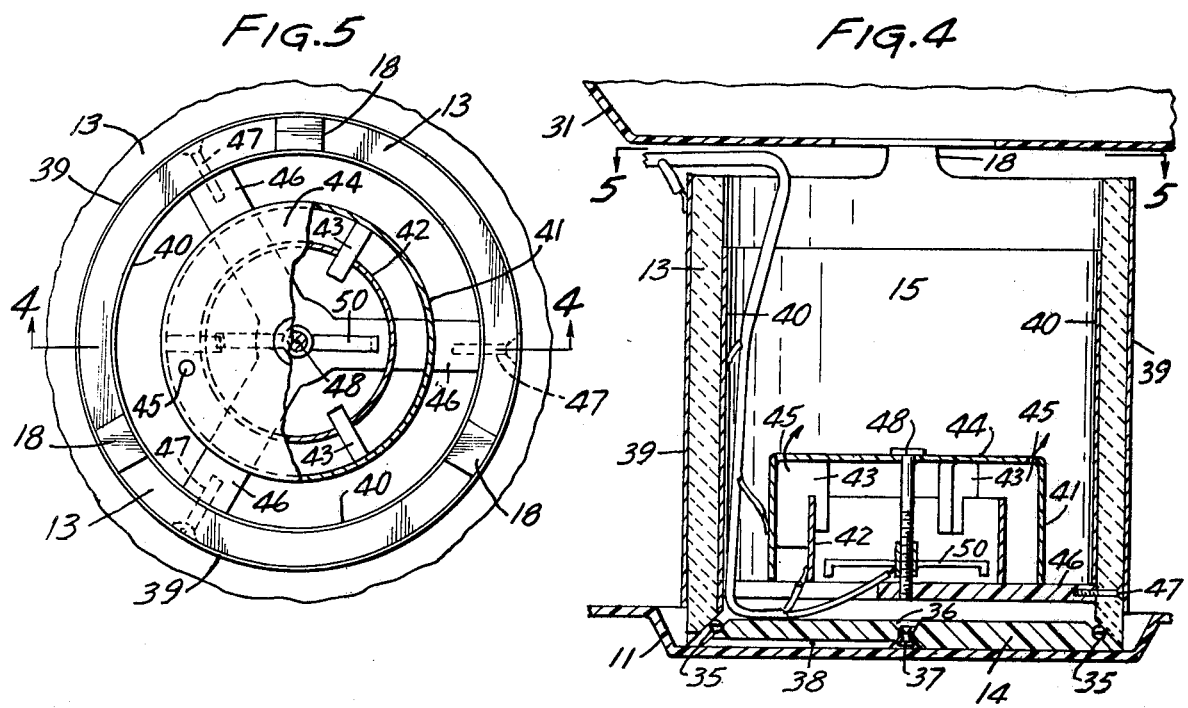

ELECTRODE-TYPE VAPORIZER

RELATED APPLICATION

This application is a continuation-in-part of Ser. No. 444,337, filed Feb. 21, 1974, now U.S. Pat. No. 4,028,526 which application is a continuation-in-part of Ser. No. 832,279, filed June 11, 1969, now U.S. Pat. No. 3,809,374.

BACKGROUND OF THE INVENTION

This invention relates to an improvement in electrode-type vaporizers and in one aspect to an improved steam generating head, suitably wired and grounded to reduce the hazards existing in present steam vaporizers.

DESCRIPTION OF THE PRIOR ART

Prior known steam generators of the electrode-type have been commercially popular but all known types have been hazardous causing electrical shocks, steam burns and scalds by the hot water. The prior known steam generators are illustrated in prior art patents such as U.S. Pat. Nos. 2,140,516, issued Dec. 20, 1938, to Cowan; and 3,420,509, issued Jan. 7, 1969 to Katzman et al. These patents utilize the electrode-type of steam generating head for the humidifier. The use of opposed electrodes to produce the steam causes the insoluble minerals left in the water after generation of the steam to collect and form scale in the chamber, plugging the holes and the soluble minerals cause current to flow through the water between the electrodes. As the amount of soluble minerals increase there is an increase in the conductivity of the water. This increased conductivity increases the amount of current drawn in the continued generation of the steam. The increase in current i.e. amperage, causes an increase in the amount of steam generated. The amount of conductive surface on the opposed immersed electrodes also controls the amount of steam generated. Therefore, even though the amount of water over the electrodes may decrease as the concentration of electrolytes increase there is no control of the steam output in these prior systems. Output is based solely on concentration of electrolytes in the water and the amount of water.

The humidifier of U.S. Pat. No. 2,140,516 is of the electrode-type but the porous low resistance electrodes are confined on opposite surfaces of a cylindrical spacer wick, which wick would eventually plug up with the deposits from the minerals remaining after the moisture within the wick is heated and vaporized. There is no open path between these electrodes such that the steam generation or vapor pressure of the steam within the boiling chamber or well 24 will have any affect on the water between the electrodes or on the purged minerals to clean the electrodes. The amount of water admitted through the one-way valve will vary as the height of the water in the reservoir decreases and that is the only control provided.

The steam generator of the type disclosed in U.S. Pat. No. 2,847,547, issued Aug. 12, 1958 to Gordon utilizes the vapor pressure to maintain a constant level of water within the vapor chamber 2 and not a controlled steam release. This teaching of using a vapor pressure for maintaining the water level over an immersion heater does not teach the present invention nor is the use of a circular immersion heater a teaching to one skilled in the art to utilize circular electrodes within a container, which container is formed to control steam generation and maintain a controlled power requirement as taught by the invention described in this application.

U.S. Pat. No. 3,267,678, issued Aug. 23, 1966 to Camp, utilizes a capillary tube of a predetermined dimension to control the flow rate of water into a steam generator and for thermally and hydrostatically isolating the steam generator. Steam generation thus relies on a hydrostatic head and is controlled thereby.

The vaporizer currently marketed by Campillary Systems Inc. of Port Chester, New York 10573 utilizes a steam generating chamber disposed in a reservoir and having a small opening at the bottom allowing water to enter at a rate controlled by the steam pressure developed in the chamber by the electrodes. Since the steam output is restricted by a smaller outlet in the top of the steam chamber the steam pressure controls the water input but it is variable since a higher hydrostatic head increases the pressure in the chamber and the increased pressure increases the amount of steam discharged and the length of the jet of steam discharged from the discharge outlet. The jet of steam is hazardous and may burn someone. Further, the increased pressure causes the jet of steam to include occasional sprays or droplets of hot water.

The electrode devices have a further disadvantage in that an electrical leak is produced from the steam chamber by electrically charged water being purged through the inlet opening which is hazardous when the current is carried through the mineralized water. This provides a shock hazard if one places a hand in the reservoir water because this electrical current is freely transferred through the current conducting electrolyte solution. This hazard is consistently brought out by consumer protective publications and electrode heaters are consistently condemned because of this problem. No known vaporizer is produced to eliminate the potential of this hazard.

Further, the boiling chambers with small openings prevent the boiling liquid from escaping when the chamber is separated from the reservoir. This is due to the fact that the small inlet opening restricts the prompt discharge of the water. If the dripping water is allowed to drop onto one's skin a burn may result.

In addition, the prior known humidifiers or vaporizers are void of any teaching of placing an additional neutral wire in the steam chamber or to surround the boiling chamber to prevent shocks by carrying away any charge.

Therefore, an improvement in design to produce a vaporizer which will discharge clean vapor and avoid burns, electrical shock, or variations in steam output during the vaporization of a reservoir of water is the subject of applicant's invention. The structure to avoid the discharge of a jet of scalding steam and to avoid possible contact with hot water from the boiling chamber upon separating the vaporizer members is claimed in copending application Ser. No. 832,279, filed June 11, 1969, now U.S. Pat. No. 3,809,374.

The present invention is directed at a novel structure for cleaning the electrodes, controlling the discharge of steam from an electrode type heating system, restricting the possibility of electrical shock, removing the possibility of the development of a steam chamber which may become hazardous by the plugging of any restricted outlet, and restricting the possible use of the device where there is not a properly grounded outlet.

SUMMARY OF THE PRESENT INVENTION

A room-type vaporizer constructed in accordance with the present invention provides for constant steam output at a current or energy level which is continuous after the device starts to generate steam. The structure of the device further provides for a cleaning action on the electrodes to avoid a concentration of minerals between the electrodes as the amount of water in the reservoir is diminished. The device is constructed such that the clean (mineral and germ free) vapor released from the vaporization chamber is mixed with room air drawn into the humidifier and a cooled moist vapor or "cool steam" is discharged. The electrode-type vaporizing head comprises a pair of arcuate electrodes in the form of coaxial, opposed cylindrical rings which are positioned to place the outer cylindrical surface of one ring in opposed relationship to the inner cylindrical surface of the other. The electrodes are positoned near the bottom of the vaporization or boiling chamber.

The invention further provides means for controlling the amount of steam which is generated or permitted to escape from between the electrodes. The steam limiting structure is provided by enclosing the area between the electrodes and affording control means to permit the steam to escape. In the preferred embodiment the outer electrode is formed of stainless steel and encloses the inner electrode. The outer electrode extends around the inner electrode and has a tubular upper end extending above the level of the water in the boiling chamber at any one time. An adjustable valve on the upper tubular end of the outer electrode and supported thereby controls the amount of steam released and directs the steam toward the water surface in the boiling chamber and it is then allowed to pass around the valve and be mixed with the air in the reservoir.

A fan positioned directly above the boiling chamber draws the steam from the generator into a stream of air which is pulled into the reservoir surrounding the boiling chamber such that the steam is mixed with the ambient room air and is expelled with sufficient air that the steam is cooled below a scalding temperature.

DESCRIPTION OF THE DRAWING

The present invention will be more fully understood after reading the following detailed description which refers to the accompanying drawing wherein:

FIG. 4 is an enlarged fragmentary vertical sectional view of the boiling chamber;

FIG. 5 is a top view of the boiling chamber taken along lines 5—5 of FIG. 4;

FIG. 6 is a schematic wiring diagram;

DESCRIPTION OF THE INVENTION

Figure 1:
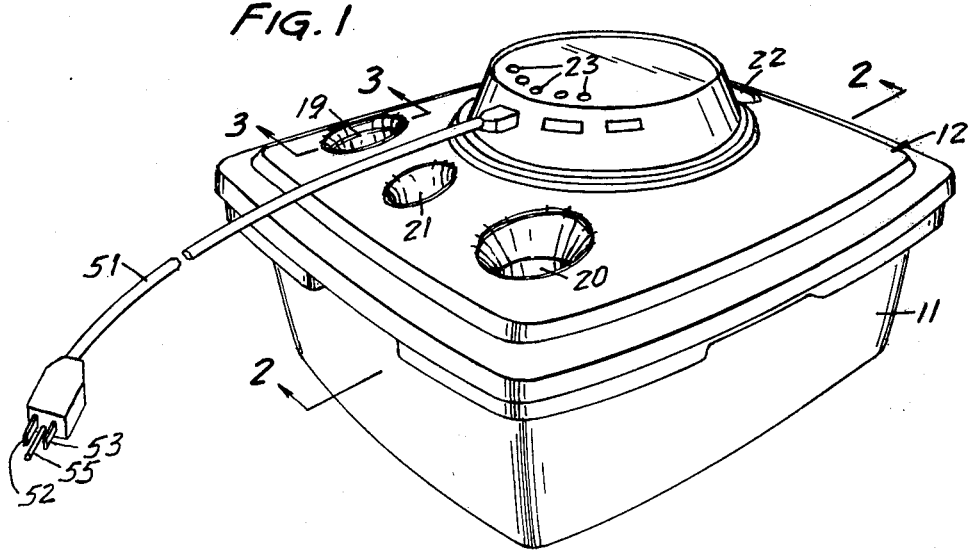
FIG. 1 is a perspective view of a vaporizer structure constructed according to the present invention.
Figure 2:
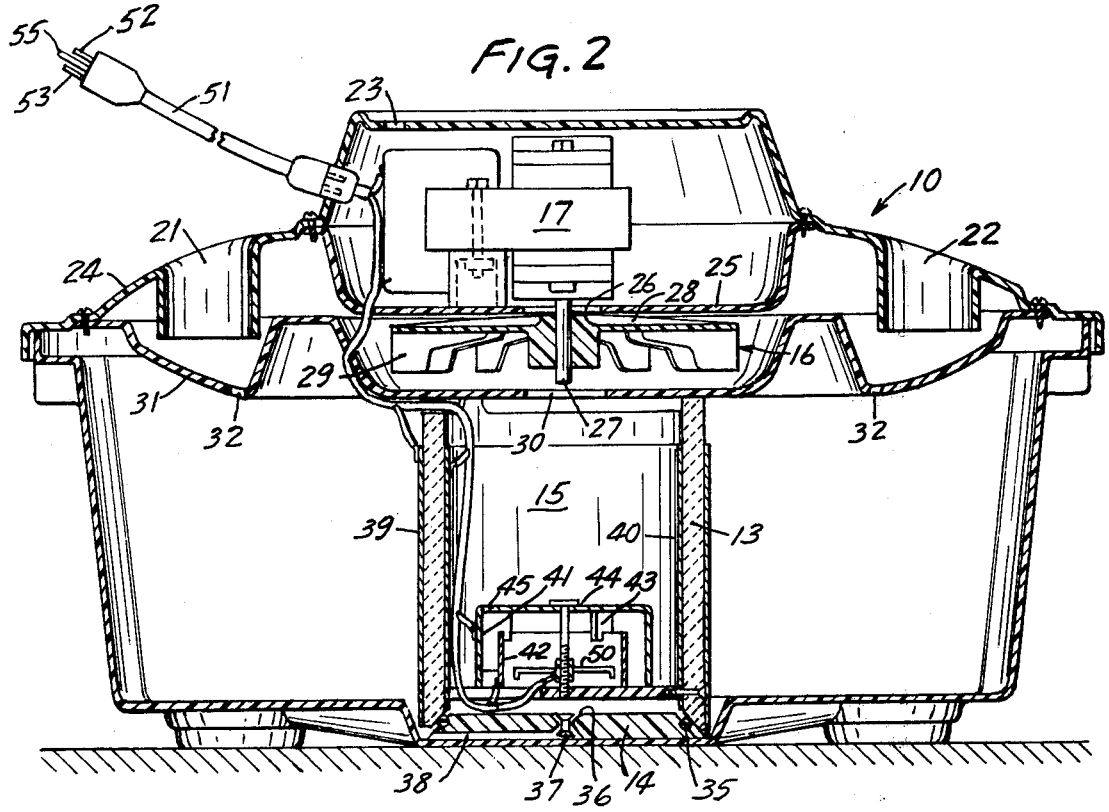
FIG. 2 is a vertical sectional view taken along the lines 2—2 of FIG. 1.

The vaporizer 10, illustrated in FIG. 1 comprises a molded base 11, of trapezoid shape in plan which forms the reservoir for the water, and a cover 12. The cover 12 is formed to mate and be supported on the upper edge of the base 11. A hollow cylindrical insulative tubular wall member 13 together with a mating plate or disk 14 supported in the base 11 define a vaporization or boiling chamber 15. The cylinder 13 is secured to and is supported by the cover 12 and the disk 14 is preferably removably secured to the base 11. The boiling chamber is formed when the cover is placed on the base. A fan or blower 16 is supported in a manifold formed in the cover directly above the boiling chamber 15. The fan 16 is driven by a motor 17 supported in the cover. Steam is generated in the boiling chamber 15, and, as the same is generated, the blower 16 mixes the steam with room air which has been drawn into the base through inlet openings 19 and 20. The mixed steam and air is expelled through vapor discharge openings 21 and 22 in the cover 12 leading out of the manifold.

Figure 3:
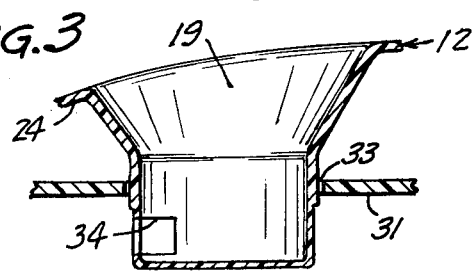
FIG. 3 is a vertical sectional view taken along the lines 3—3 of FIG. 1.

The cover 12 comprises a molded main shell 24 in which is formed cylindrical walls defining the openings 19, 20, 21 and 22, and part of the motor housing in which is formed air holes 23 permitting air into the motor housing. The remainder of the motor housing is formed by a molded dish 25 having an opening 26 through which extends the motor drive shaft 27 which supports the fan 16. Fan 16 has vanes 28 on the top surface to draw air through holes 23 into the motor housing and out through opening 26. Vanes 29 on the fan 16 draw air and steam through an opening 30 in a lower cover plate 31. The cover plate 31 encloses the fan 16 and forms the manifold chamber with shell 24 through which the mixture of steam and air is forced to the discharge openings 21 and 22. The plate 31 has holes 32 permitting any condensation to run back into the base reservoir and openings 33 through which extend the cylindrical walls forming inlet openings 19 and 20 (FIG. 3). The air inlets communicate directly with the base. The walls forming the inlet openings 19 and 20 have a closed end and apertures 34 in the side walls below the plate 31. This prevents objects from being dropped into the reservoir. Inlet openings could alternatively be formed in the base above the normal water level or air could enter between the cover and the base. The amount of air permitted to enter the base, with a given size fan, determines the temperature of the air/steam (cool steam) discharged.

The boiling chamber 15 is formed when the cylindrical wall 13 is in abutting mating engagement with the disk 14 supported in a central portion of the bottom wall of the base 11. The top of cylindrical wall 13 is secured to the cover plate 31 coaxially with the opening 30 by spaced posts 18. The disk 14 is formed of an insulating material and preferably is releasably secured to the base 11 to permit the disk and bottom wall of the base to be cleaned. The disk 14 is circular and relatively thin with beveled edges grooved to support an O-ring 35 of circular cross-section. The disk 14 also has a central opening 36 in which is placed a one-way check valve 37 to restrict the flow of water from the boiling chamber into the base. The opening 36 communicates with the reservoir of the base via a passageway 38 or by the disk being supported in spaced relationship to the bottom wall of the base. The check valve 37 is in the form of a bolt having a head to seal in the countersunk portion of the opening 36 and gravity or pressure inside the boiling chamber will close it to allow water to flow in and restrict the flow of hot water out of the boiling chamber into the surrounding storage reservoir.

The cylinder 13 forming the boiling chamber is affixed to the underside of the cover plate 31 and is chamfered on the lower or free end to mate with the peripheral beveled edge of the disk 14 and seal on the O-ring 35. The outer surface of the hollow cylinder 13 is covered or coated by a conductive metal layer 39 and a conductive metal layer 40 is formed about the inner cylindrical wall from a position near the bottom of the boiling chamber to a position spaced slightly from the top of the cylinder. The function of the conductive coatings or layers 39 and 40 will be discussed in more detail later in the description. The layers 39 and 40 may be conductive rings, layers of a metal foil or a vapor coating of conductive material. The cylinder 13 is supported by at least three posts or projections in spaced relationship from the plate 31 about the opening 30 to permit air to enter at the top of the boiling chamber 15 and mix with steam developed therein.

The steam is generated by heating the water between a pair of electrodes 41 and 42 supported by spacing, insulative members 43 in the lower part of the chamber 15 adjacent the disk 14. The electrodes 41 and 42 illustrated are cylindrical rings of different radius positioned in coaxially opposed spaced relation such that the outer surface of the small ring 42 is in opposed spaced position to the inner surface of the larger ring 41 to permit the heating of the water by its electrical resistance. As illustrated the electrode 41 has a larger axial dimension than the electrode 42. This increased length permits it to support an end wall 44 spaced from electrode 42 forming thereby an inverted cup enclosing the electrode 42. The end wall 44 is formed with control means illustrated as a plurality of openings 45 which have a predetermined size and number and control the amount of steam which is allowed to escape from between the electrodes. The small openings let the steam within the electrode 41 escape without excessive agitation of the water in the boiling chamber above the electrode 41. The bubbles of steam then escape from the electrode 41 and as the steam builds up in the electrode above the amount allowed to escape it forces the water level within the inverted cup down toward the disk 14. Means may be provided to adjust the size or number of holes exposed to control or adjust the amount of steam generated. Such adjustment may be provided by telescoping walls of the electrode 41 or by relatively rotatable disks forming the end wall 44 both of which disks would have openings and would thus adjust the size or number of openings.

As the water is boiled between the annular electrodes and steam is produced, the steam pressure is produced in surges developing downward pressure between the electrodes tending to cause movement of the water between the electrodes which has a desirable cleaning effect on the opposed surfaces and retards scale buildup.

As shown in FIGS. 4 and 5 the electrodes are supported in a central position in the boiling chamber 15 by an insulative three-spoked support member 46 held by plastic or nonconductive fasteners 47 on the cylinder 13. A nonconductive bolt 48 and the spacers 43 hold the electrodes on the support 46 and the bolt 48 supports a conductive bar 50 which is positioned in closely spaced position above the support member 46.

The vaporizer is provided with a novel safety circuit to prevent shock and to assume operation only when connected to a properly wired and grounded outlet. The circuit has a momentary "on" switch to energize a switching hold-in circuit which is energized initially by the ground line.

A three wire cord 51 is connected to the vaporizer 10 and as shown in FIG. 6 comprises the hot nonground (+) conductor 52, the neutral conductor 53 and earth ground conductor 55. The vaporizer is placed in operation by a push button or momentary contact switch 56 placed in the hot line. The hot line 52 is connected directly to a first double throw relay switch 57 and a line 58 joins the switch 57 to the switch 56. The other side of switch 56 is connected to the coil 60 of the switch relay or to some other switch actuating means via a line 61. The line 61 and relay coil 60 are also connected via line 59 to the conductive bar 50 such that the switch actuating means is held in or energized when there is current flowing across the gap to the conductive bar 50. The switch actuating coil 60 is energized initially through a second double throw switch 62 connected to the ground line 55 via lead 65 and to the relay coil via line 66, and a normally neutral line 67 leading to the electrode 41 and metal layer 40, and line 68. Neutral line 53 is initially open and is connected to a third double throw relay switch 63. If the outlet is not properly grounded or not provided with a ground line the vaporizer will not and cannot be energized when the switch 56 is closed. If there is a proper ground which is connected to the layer 39 and switch 62 then closing switch 56 causes current flow through hot line 52, switch 57, line 58, switch 56, line 61, coil 60, lines 68, 67 and 65 and ground line 55 to actuate the switch actuating device. Thus the switch actuating device will cause a switching of switches 57, 62 and 63 from the normal positions shown to their alternate position.

Switch 57 shifts the hot (+) line to a line 69 to energize the motor 17 and the inner electrode 42. The presence of water in the vaporization chamber 15 allows current from the hot electrode to be carried across the gap to the bar 50 and via line 59 to the relay coil 60. Bar 50 and the line 59 and line 68 thus hold the switches closed. Line 69 will also energize an "on" red neon lamp 70 as switch 63 closes the neutral path from line 53 to line 67. Switch 62 shifts the ground line 65 to a lead 71 directed to a green lamp 72 which indicates the vaporizer is suitably grounded. If the vaporizer runs out of water and the conductive path from electrode 42 to the bar 50 is opened the switch actuating device (coil 60) is de-energized or triggered to return the switches 57, 62 and 63 to their normal position and the motor 17 is de-energized and the electrodes are no longer joined to the current source. The chassis of the motor 17 is joined to the ground line 71 via a line 73.

Figure 7:
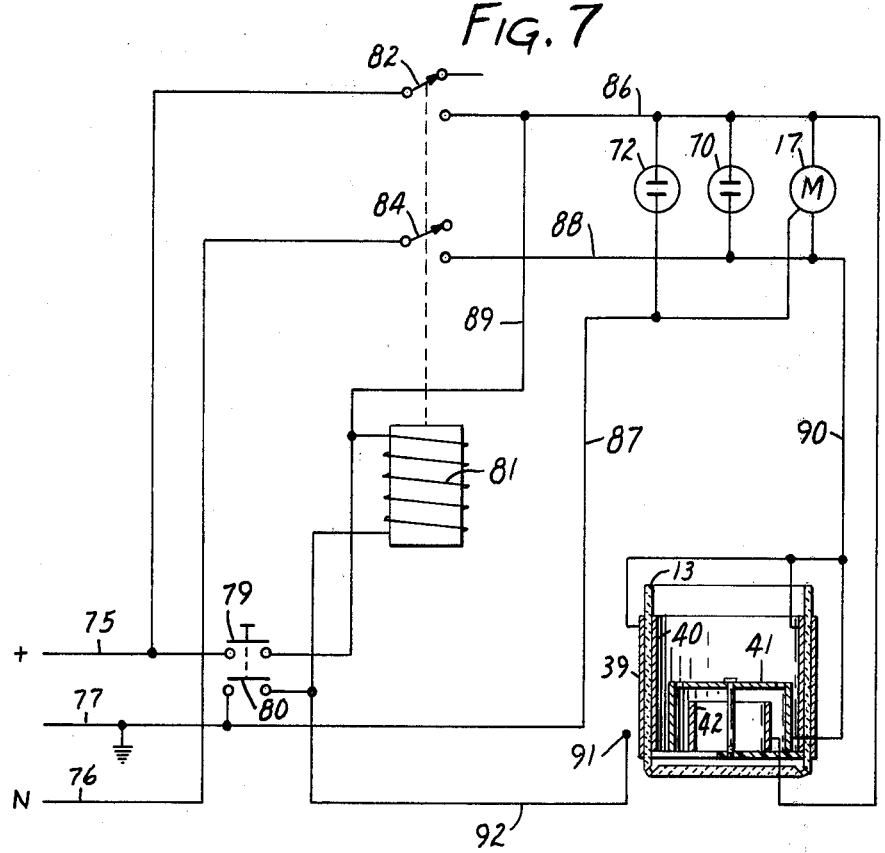
FIG. 7 is a schematic wiring diagram showing a second embodiment.

An alternative circuit for the motor 17, lamps 70, 72, electrodes 41 and 42, and in this embodiment the layers 39 and 40, are joined and both are coupled to the electrode 41, as shown in FIG. 7. The cord 51 contains a hot (+) line 75, a neutral line 76 and a ground line 77. The line 75 is connected to one blade 79 of a double pole momentary contact switch and ground line 77 is connected to the other blade 80. Closing this switch momentarily will energize a switch actuating member or relay coil 81. The relay coil will, if a ground was provided at the outlet, close a pair of normally open switches 82 and 84. Switch 82 when closed will connect a line 86 to a hot line 75 to energize the motor 17, "on" lamp 70, the electrode 42 and via a line 89 will connect the hot (+) line to the coil 81. Switch 84 is connected to neutral line 76 and when closed will connect the line 76 to line 88 which is connected to the lamp 70 and to the motor 17. Line 88 is also connected via line 90 to the electrode 41 and to the conductive layers 39 and 40. In this embodiment a water level sensor and turn-off means is provided by an exposed sensing contact 91 supported on the cylinder 13 in spaced relation to the layer 39 which is connected to the neutral line. The sensor 91 is connected by a line 92 to the coil 81. When switch 84 is closed and water is in the reservoir the gap between sensor 91 and the coating 39 is closed and the relay switches 84 and 82 are held closed.

In the event there is neither a proper ground initially at the outlet or no water in the base 11 covering the sensor 91, closing switch blades 79 and 80 will not energize the relay coil 81. If there is a proper ground but no water, the switches 82, 84 will not remain closed. A properly wired outlet will have the hot wire to the right or counterclockwise from the ground receptacle. If the outlet is improperly wired with the hot wire and neutral reversed relative to the ground the switching device will not be energized and there will not be any electrical activity.

If ground potential is present on line 77 and water in the base covers the sensor 91, closing switches 79, 80 energizes coil 81 switching the position of contacts 82 and 84. The switches 79, 80 can then be released and current passing through the line 75, switch 82, line 86, line 89, coil 81, line 92, sensor 91, the water, conductive layer 39, line 90, line 88, switch 84 and neutral line 76 maintain the circuit closed for the fan motor 17 and electrodes 41 and 42. When all the water is boiled away above sensor 91 the circuit opens through the coil and as a result switches 82 and 84 are opened.

The coated layers 39 and 40 serve to neutralize the water about the electrodes and to neutralize the water in the reservoir surrounding the boiling chamber. This neutralization of any charge in the water or the possibility of current moving through the water to another object is controlled by the presence of the earth ground 55 connected to coating 39 or the neutral conductor 90 being connected to coating 39. These circuits avoid possible shocks from contact with the water while the electrodes are providing a potential therebetween.

The vaporizer 10 constructed according to the present invention will provide a controlled, cool, clean steam generator with a constant output. Steam generation from the enclosed electrodes is controlled by the rate of its own steam generation to make the output uniform. Important also is that the device will be safe from electrical shock and will shut off automatically when all the water is boiled away, when the cover is lifted off the base, when the unit is accidently tipped over, or when there is an interruption in the electrical power supply. This electrode vaporizer with the controlled output and automatic shutoff thus all the benefits of an immersion heater vaporizer with a thermostat. The ground energized relay or the switching device can be a comparable solid state switching device as is well known in the art.

Figure 8:
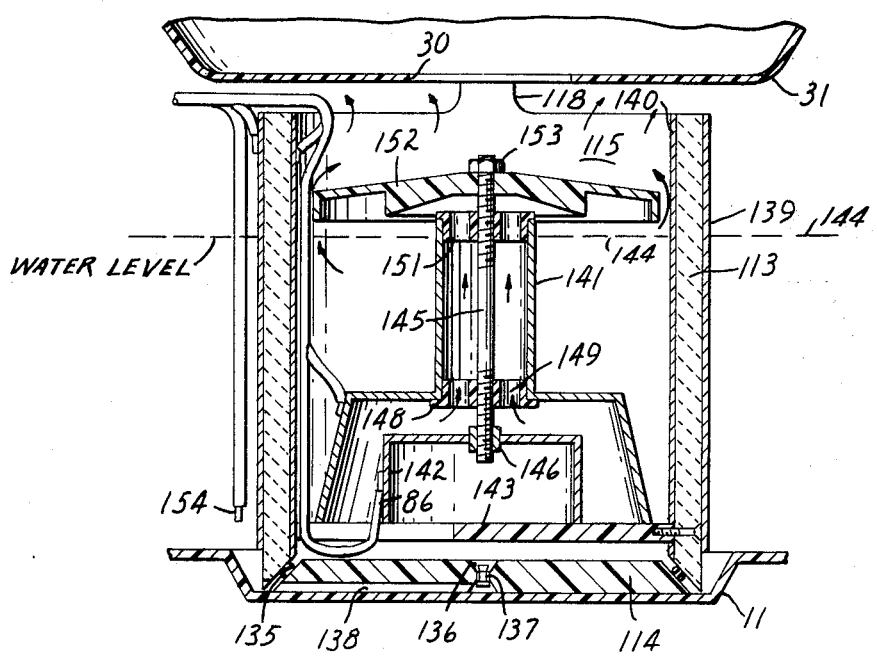
FIG. 8 is an enlarged fragmentary vertical sectional view of a further preferred detailed embodiment of the boiling chamber.

Referring now to FIG. 8, there is illustrated a further embodiment of the boiling chamber. This embodiment is preferred from the standpoint of protecting against the possible spreading of any germs, bacteria etc., which may be in the water. This structure effectively restricts the possibility of any germs etc. from reaching the manifold as a result of spattering of the water in the boiling chamber as the bubbles of steam rise to the surface from the inverted cup 41 in the vaporizer as illustrated in FIG. 4. The water droplets deposited in the manifold place germs in the air passing therethrough.

In this embodiment the boiling chamber 115 is formed when a tubular wall 113, which is preferably cylindrical, is in abutting mating engagement with a disk 114 supported in a central portion of the bottom wall of the base 11. The top of cylindrical wall 113 is secured to the cover plate 31 coaxially with the opening 30 by spaced posts 118. The wall 113 and disk 114 are formed of an insulating material. The disk 114 is preferably releasably secured to the base 11 to permit the disk and bottom wall of the base to be cleaned. The disk 114 is circular and relatively thin with beveled edges grooved to support an O-ring 135 of circular cross-section. The disk 114 also has a central opening 136 in which is placed a one-way check valve 137 to restrict the flow of water from the boiling chamber into the base. The opening 136 communicates with the reservoir of the base via a passageway 138 and water flows into the chamber 115 as described with respect to the description of the boiling chamber 15.

The cylinder 113 forming the boiling chamber is affixed to the underside of the cover plate 31 and is chamfered on the lower or free end to mate with the peripheral beveled edge of the disk 114 and seal on the O-ring 135. The outer surface of the wall 113 is covered or coated by a conductive metal layer 139 and a conductive metal layer 140 is formed about the inner wall. The function of the conductive coatings or layers 139 and 140 is similar to that of the layers 39 and 40 discussed above. The layers 139 and 140 may be conductive rings, layers of a metal foil or a vapor coating of conductive material. The cylinder 113 is supported by at least three posts or projections in spaced relationship from the plate 31 about the opening 30 to permit air to enter at the top of the boiling chamber 115 and mix with steam developed therein.

The steam is generated by heating the water between a pair of electrodes 141 and 142 supported by an insulative member 143 in the lower part of the chamber 115 adjacent the disk 114. The electrodes 141 and 142 illustrated are formed of stainless steel. The inner electrode 142 is shaped like an inverted cylindrical cup and is the hot or positive electrode (+), and is connected to the conductor 86. About the inner electrode and enclosing the inner electrode is the second inverted electrode 141 which has a funnel or bell-shape and tapers to increase the spacing between the opposed surfaces of the electrodes adjacent the bottom of the boiling chamber 115. The electrodes 141 and 142 rest on an insulative support 143 which corresponds to the member 46 except that no center opening is provided. The upper portion of the outer electrode 141 extends vertically above the top of the electrode 142 to a level or position to place the open top thereof above the recommended level of the surface of the water 144 in the chamber 115 or reservoir when the vaporizer is filled.

The top of the electrode 142 and the upper portion of the electrode 141 support a rod 145. The rod 145 is threaded into a threaded collar 146 affixed to the electrode 142 and to a threaded insulating support 148 having openings 149 positioned at the lower end of the upper portion of electrode 141. The rod 145 then extends, or is threaded, through a second insulating support 151 and extends above the top of the electrode 141. A circular disk 152 is threaded onto the top of the rod 145 and is adjustable thereon vertically to vary the spacing from the top of the electrode 141 and support 151. This adjustment permits adjustment of the amount of steam that can escape from the electrodes out the openings in the support 151. The under surface of the disk 152 has a crowned or sloping surface to direct steam striking the under surface of the disk 152 downward toward the surface of the water in the boiling chamber 115. The periphery of the disk 152 is spaced from the inner coating 140 of the wall 113 to allow steam to be drawn from the chamber 115 into the manifold by the fan through opening 30. The disk 152 is held in adjusted position by a lock nut 153.

The electrode 141, conductive layers 139 and 140 are connected to the neutral line and a sensor 154 corresponding to the sensor 90 is positioned in adjacent spaced relation to the layer 139. The sensor 154 serves to maintain the coil 81 of the switching device energized until the water in the reservoir drops below the sensor and to the bottom of the electrodes. The electrodes 141 and 142 are spaced further at their bottom portions as the water remaining when at that level is strongly mineral and the conductivity is higher. Therefore, the spacing aids to maintain a more constant resistance between the electrodes as the mineral content increases. The collar 146, supports 148 and 151, disk 152 and lock nut 153 can all be formed of nylon to be insulative, corrosion-resistant and freely threadably movable relative to the rod 145.

Having described the present invention with reference to the illustrated embodiments it should be understood that other modifications can be made without departing from the spirit of the invention as defined in the appended claims.

I claim:

1. A vaporizer for generating small amounts of steam comprising
    a tubular member defining a boiling chamber for containing a quantity of water, said tubular member being formed of electrically and thermally insulative material,
    a pair of spaced electrodes having surface portions in opposed spaced relationship positioned in said member for at least partial immersion in said quantity of water, said electrodes including an inner electrode and a spaced outer electrode with the opposed surface portions of said outer electrode extending about the periphery of said inner electrode, and
    steam control means for limiting the escape of steam from the space between said electrodes, said steam control means including means defining together with said outer electrode an open bottomed structure open below the space between the electrodes and means above the space between the electrodes for trapping steam generated by the electrodes thereby restricting the escape of the generated steam and controlling the rate of further steam generation, said means for trapping steam including an extended upper end portion on said outer electrode having an upper opening, said upper end portion being positioned above the quantity of water and communicating with the space between the opposed electrodes, and a disk supported above said upper opening, said disk being adjustable toward and away from said upper opening and cooperating therewith for restricting the amount of steam which may exhaust from said upper opening and having an undersurface formed for directing steam and water droplets reaching said upper opening back toward the quantity of water.

2. A vaporizer according to claim 1 wherein said tubular member is disposed down in a base member forming a reservoir for water and wherein said tubular member comprises a cylinder, and valve means are formed in said boiling chamber for permitting water to flow from said reservoir to said boiling chamber but restricting flow of any hot water from the boiling chamber to said reservoir.

3. A vaporizer according to claim 2 wherein said cylinder has an open bottom, said base member has a disk disposed in the bottom thereof joined in mating abutting relationship with the open bottom of said cylinder thereby enclosing the bottom on said boiling chamber and said valve means are disposed in said disk.

4. A vaporizer according to claim 3 wherein a conductive member is positioned about the outer surface of said cylinder and positioned thereon to be immersed at least partially in said quantity of water and adapted to be connected to one of the ground conductor and neutral conductor of an electrical cord through which electric power is supplied to said electrodes to avoid possible shock.

5. A vaporizer according to claim 1 wherein the spacing between said opposed surface portions of said electrodes increases toward the lower portions of said surface portions.

6. A vaporizer according to claim 1 wherein said pair of electrodes comprises an inner generally cylindrical electrode supported on an insulative support and an outer electrode which encloses said inner electrode, said outer electrode having a generally conical inner surface portion opposed to said inner electrode and said extended upper portion extends above said inner electrode to a position near the top of said boiling chamber and terminates in said upper opening communicating with the space between said electrodes, and wherein said disk has a crowned undersurface to direct steam and any water droplets back toward the surface of the quantity of water.

* * * * *